United States Patent
Takase

(10) Patent No.: US 9,366,424 B2
(45) Date of Patent: Jun. 14, 2016

(54) LIGHT SOURCE DEVICE COMPRISING A DRIVER CIRCUIT MOUNTED ON A REAR SURFACE OF A SUBSTRATE AND LIQUID CRYSTAL DISPLAY DEVICE

(71) Applicant: Sharp Kabushiki Kaisha, Osaka (JP)

(72) Inventor: Kenji Takase, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/701,811

(22) Filed: May 1, 2015

(65) Prior Publication Data

US 2015/0308675 A1 Oct. 29, 2015

Related U.S. Application Data

(62) Division of application No. 13/254,396, filed as application No. PCT/JP2009/068167 on Oct. 22, 2009, now abandoned.

(30) Foreign Application Priority Data

Mar. 2, 2009 (JP) .................................. 2009-047599

(51) Int. Cl.
*G02F 1/1335* (2006.01)
*F21V 29/70* (2015.01)
(Continued)

(52) U.S. Cl.
CPC . *F21V 29/70* (2015.01); *F21K 9/50* (2013.01); *F21V 23/005* (2013.01); *F21V 29/503* (2015.01); *G02F 1/133603* (2013.01);
(Continued)

(58) Field of Classification Search
CPC .................... G02F 2001/133628; F21V 29/70; F21V 29/503; F21K 9/50
USPC ..................................................... 349/61–65
See application file for complete search history.

(56) References Cited

U.S. PATENT DOCUMENTS

2004/0218388 A1 11/2004 Suzuki
2005/0253980 A1 11/2005 Saito et al.
(Continued)

FOREIGN PATENT DOCUMENTS

JP 2002-72901 A 3/2002
JP 2003-330424 A 11/2003
(Continued)

OTHER PUBLICATIONS

International Search Report (ISR) issued in PCT/JP2009/068167 (International application) mailed in Dec. 2009 for Examiner consideration.

*Primary Examiner* — Paul Lee
(74) *Attorney, Agent, or Firm* — Chen Yoshimura LLP

(57) ABSTRACT

A light source device includes: a substrate having a front surface on which a light-emitting diode is mounted; and a case having a bottom plate that holds the substrate, wherein a driver circuit for driving the light-emitting diode is mounted on a rear surface of the substrate that is opposite to the front surface thereof, wherein an opening corresponding to a size of the light-emitting diode is formed in the bottom plate of the case, wherein the front surface of the substrate is fixed to a rear surface of the bottom plate of the case from outside of the case with the light-emitting diode fitted in the opening, and wherein a coating material with an emissivity of equal to or higher than 0.9 and equal to or lower than 1.0 is applied to an outer surface of four side walls of the case.

8 Claims, 14 Drawing Sheets

(51) Int. Cl.
*F21V 29/503* (2015.01)
*F21K 99/00* (2016.01)
*F21V 23/00* (2015.01)
*F21Y 105/00* (2016.01)

(52) U.S. Cl.
CPC ..... *G02F1/133608* (2013.01); *F21Y 2105/001* (2013.01); *F21Y 2105/003* (2013.01); *G02F 2001/133628* (2013.01)

(56) References Cited

U.S. PATENT DOCUMENTS

| | | | |
|---|---|---|---|
| 2006/0092666 A1 | 5/2006 | Jeong et al. | |
| 2006/0186425 A1 | 8/2006 | Yano et al. | |
| 2006/0279671 A1 | 12/2006 | Han et al. | |
| 2007/0153548 A1* | 7/2007 | Hamada | G02B 6/0036 362/615 |
| 2007/0211205 A1* | 9/2007 | Shibata | F21V 29/74 349/161 |
| 2008/0019134 A1* | 1/2008 | Mukai | F21K 9/00 362/294 |
| 2008/0117356 A1* | 5/2008 | Oku | G02F 1/133603 349/62 |

FOREIGN PATENT DOCUMENTS

| | | |
|---|---|---|
| JP | 2004-319458 A | 11/2004 |
| JP | 2006-58486 A | 3/2006 |
| JP | 2006-128129 A | 5/2006 |
| JP | 2006-338020 A | 12/2006 |
| JP | 2006-344429 A | 12/2006 |
| KR | 20228373 | * 11/1995 |
| KR | 19970025086 | * 11/1995 |
| KR | 200228373 Y1 | 9/2001 |
| WO | 2005/073621 A1 | 8/2005 |

* cited by examiner

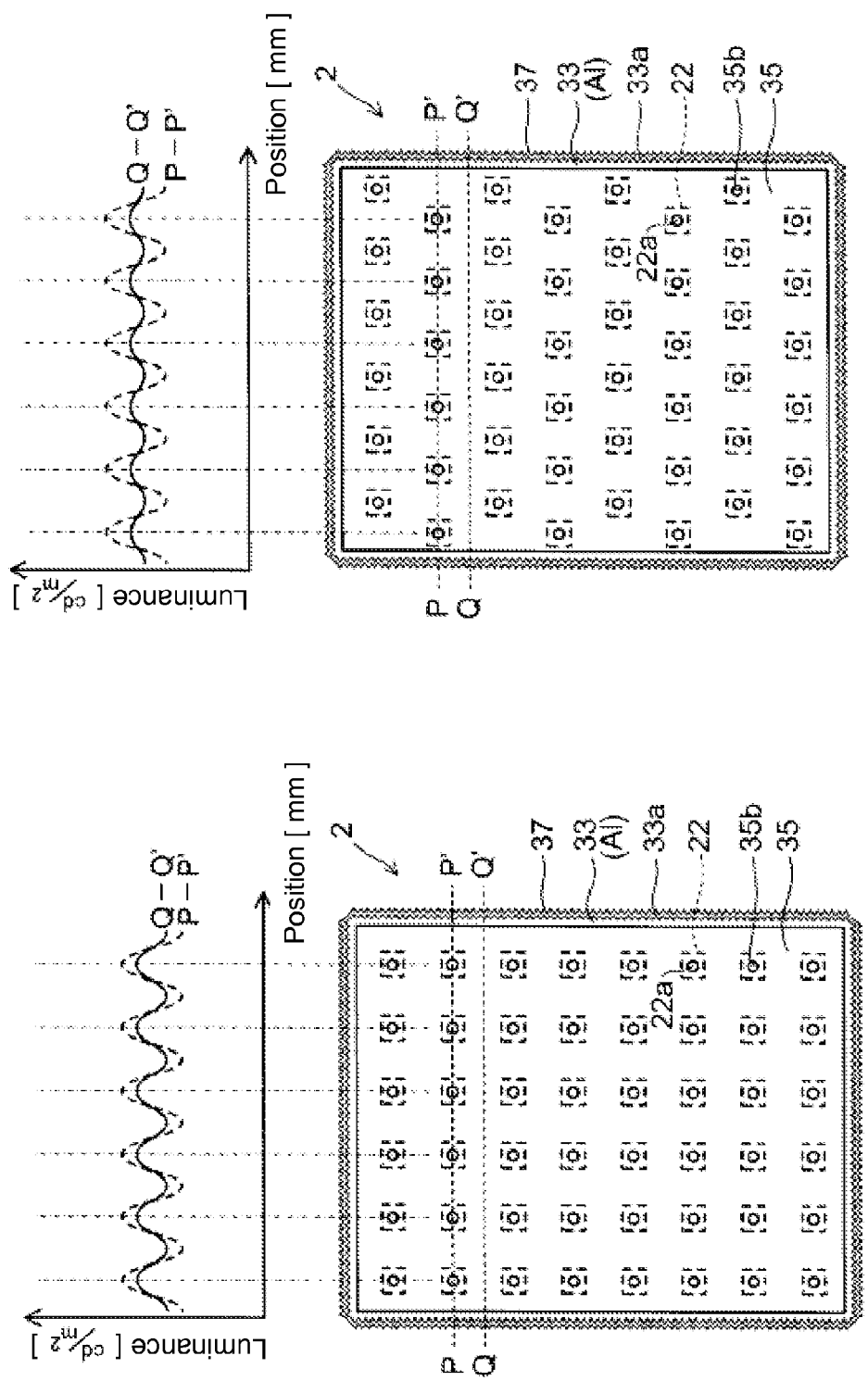

LIGHT SOURCE DEVICE COMPRISING A DRIVER CIRCUIT MOUNTED ON A REAR SURFACE OF A SUBSTRATE AND LIQUID CRYSTAL DISPLAY DEVICE

TECHNICAL FIELD

The present invention relates to a light source device having a light-emitting diode (hereinafter also referred to as an LED), and to a liquid crystal display device equipped with the light source device.

BACKGROUND ART

Patent Document 1 discloses a conventional technology, which uses an LED as a light source device for illuminating a liquid crystal panel, and which dissipates heat generated by the LED, for example. In this Patent Document 1, at least a heat dissipating plate, a heat pipe, a heat sink, and a cooling fan are disposed below the LED. Heat generated by the LED is conducted to the heat sink through the heat dissipating plate as well as the heat pipe, and the heat is then dissipated there, and by further using the cooling fan to blow wind to an area between each fin of the heat sink, the above-mentioned heat dissipation is promoted.

RELATED ART DOCUMENTS

Patent Documents

Patent Document 1: Japanese Patent Application Laid-Open Publication No. 2006-58486 (See FIGS. 1, 2, 6 and others)

SUMMARY OF THE INVENTION

Problems to be Solved by the Invention

It is possible to suppress a temperature elevation of an LED, and to suppress a decrease in light-emitting efficiency of the LED by dissipating heat generated by the LED to the outside. In order to achieve such a heat dissipation of an LED, Patent Document 1 has a configuration in which many components are used to constitute a heat dissipating mechanism of the LED, and these components are further disposed below the LED, that is, in a thickness direction of the device. As a result, a problem of increases in light source device's thickness, weight, and cost is introduced.

The present invention was devised in order to solve the above-mentioned problems, and its object is to provide a light source device in which heat dissipation of an LED can be achieved without requiring the conventional heat dissipating mechanism to be mounted below the LED, and in which the thickness, weight, and the cost of the light source device can be reduced while suppressing a decrease in light-emitting efficiency of the LED, and to provide a liquid crystal display device equipped with the light source device.

Means for Solving the Problems

A light source device of the present invention includes a substrate having a surface on which a light-emitting diode is mounted, and a case holding the above-mentioned substrate, wherein a driver circuit for driving the above-mentioned light-emitting diode is mounted on a rear surface of the above-mentioned substrate, wherein an opening corresponding to a size of the above-mentioned light-emitting diode is formed in a bottom plate of the above-mentioned case, and wherein the above-mentioned substrate is fixed to the bottom plate of the above-mentioned case from the outside of the above-mentioned case with the above-mentioned light-emitting diode fitted in the above-mentioned opening.

According to the above-mentioned configuration, because the substrate is fixed to the bottom plate of the case from the outside of the case with the LED fitted in the opening of the bottom plate of the case, a face of the rear surface of the substrate which excludes a portion on which the driver circuit is mounted is in contact with outside air. This way, heat generated by the LED is dissipated to the outside air through the substrate. Accordingly, heat dissipation of the LED can be achieved without requiring a conventional heat dissipating mechanism (a heat dissipating plate, a heat pipe, a heat sink, and a cooling fan) made of many components to be mounted below the LED. As a result, the light source device can be reduced in thickness, weight, and cost while suppressing an increase in temperature inside the case, and suppressing a decrease in light-emitting efficiency of the LED.

The light source device of the present invention may further include a heat conductive sheet that conducts heat of the above-mentioned light-emitting diode, wherein the above-mentioned substrate may be fixed to the bottom plate of the above-mentioned case through the above-mentioned heat conductive sheet.

In this configuration, heat of the LED is conducted through the heat conductive sheet in a direction in which the sheet is laid (in a horizontal direction perpendicular to a thickness direction of the sheet), and then the heat is dissipated through the substrate. Therefore, it is possible to increase heat dissipating performance near the LED, and to even out the temperature in the horizontal direction (uneven temperature can be reduced). As a result, it is possible to reduce an increase in peak temperature near the LED, and to achieve a higher effect of suppressing a decrease in light-emitting efficiency of the LED.

The light source device of the present invention may further include a reflective sheet for reflecting incident light, wherein the above-mentioned reflective sheet may include a hole that is formed in a position corresponding to a light-emitting part of the above-mentioned light-emitting diode, and may be formed in the bottom plate of the above-mentioned case on a surface opposite to a side to which the above-mentioned substrate is fixed so as to cover the entire region except for the above-mentioned light-emitting part.

In this case, the above-mentioned reflective sheet covers a gap around the LED as well as a surface other than the light-emitting part of the LED, and therefore, even when LED light, which has been emitted from the light-emitting part and has passed through the hole of the reflective sheet, is reflected inside the case and comes back to near the LED, it is possible to prevent the light from being absorbed in the gap near the LED and in the surface other than the light-emitting part of the LED. As a result, it is possible to achieve a light source device with high light usage efficiency in which the above-mentioned loss of light absorption is eliminated.

In the light source device of the present invention, an outer surface of four side walls constituting an outer frame that is perpendicular to the bottom plate of the above-mentioned case may be a rough surface having recesses and projections.

The surface area becomes larger in this configuration compared to when the outer surface of the four side walls is a flat surface without any recesses or projections. As a result, it is possible to improve heat dissipating performance in the four side walls, and to further suppress a decrease in light-emitting efficiency of the LED.

In the light source device of the present invention, a coating material with emissivity of equal to or higher than 0.9 and equal to or lower than 1.0 may be applied to the outer surface of the four side walls constituting the outer frame that is perpendicular to the bottom plate of the above-mentioned case.

Because a coating material with high emissivity is applied onto the outer surface of the four side walls, the radiation amount of far-infrared rays released from the outer surface increases, and the surface temperature of the outer surface decreases. As a result, it is possible to further suppress an increase in temperature inside the case, and to further suppress a decrease in light-emitting efficiency of the LED.

In the light source device of the present invention, the bottom plate of the above-mentioned case as well as the four side walls constituting the outer frame that is perpendicular to the bottom plate may be formed of aluminum alloy.

Because aluminum alloy has higher heat conductivity (than iron, for example), heat of the LED is easily conducted to the bottom plate as well as to the side walls of the case, thereby improving heat dissipating effect of the case. As a result, it is possible to increase the effect of suppressing a decrease in light-emitting efficiency of the LED (compared to when the bottom plate as well as the side walls of the case are formed of iron, for example). Moreover, aluminum alloy has a smaller specific gravity (than iron, for example), and therefore, the light source device can be further reduced in weight (compared to when the bottom plate as well as the side walls of the case are formed of iron, for example).

In the light source device of the present invention, the above-mentioned light-emitting diodes may be disposed in a zigzag arrangement on a surface of the above-mentioned substrate.

For example, in a matrix-shaped normal arrangement in which the light-emitting diodes are disposed in two directions perpendicular to each other with an identical pitch, a pitch of the respective LEDs becomes long in oblique angles of 45 degrees with respect to the above-mentioned two directions, and therefore, luminance between the respective LEDs becomes lower in the oblique angles of 45 degrees, and the uniformity of luminance distribution becomes reduced. However, as a result of disposing the LEDs in a zigzag arrangement, distance between the respective LEDs becomes shorter in the oblique directions of 45 degrees compared to when they are disposed in the normal arrangement, and therefore, a decrease in luminance between the respective LEDs is reduced in the above-mentioned directions. Accordingly, the uniformity in luminance distribution can be improved.

In the light source device of the present invention, it is preferable that a formation pitch of the opening in the bottom plate of the above-mentioned case be equivalent to an arrangement pitch of the above-mentioned light-emitting diode mounted on a surface of the above-mentioned substrate.

According to this configuration, it is possible to certainly fix the substrate to the bottom plate of the case with a plurality of LEDs surely fitted in each of the openings.

In the light source device of the present invention, it is preferable that the above-mentioned driver circuit be mounted on a rear surface of the above-mentioned substrate in a position corresponding to an area between the adjacent light-emitting diodes.

According to this configuration, the rear surface of the substrate, which is located directly below the LEDs, is exposed, and becomes in contact with the outside air, and therefore, it is possible to improve the efficiency of heat dissipation to the outside air. This way, a decrease in light-emitting efficiency of the LEDs can be suppressed with certainty.

A liquid crystal display device of the present invention includes the above-described light source device of the present invention, and a liquid crystal panel on which light is emitted by the above-mentioned light source device.

By using the above-described light source device of the present invention, a thin liquid crystal display device with light weight and low cost can easily be achieved.

Effects of the Invention

According to the present invention, the substrate is fixed to the bottom plate of the case from the outside of the case with the LEDs fitted in openings in the bottom plate of the case, and therefore, heat of the LEDs can be dissipated to outside without requiring a conventional heat dissipating mechanism, which is made of many components, to be mounted below the LEDs. As a result, the light source device can be reduced in thickness, weight, and cost while suppressing a decrease in light-emitting efficiency of the LEDs.

BRIEF DESCRIPTION OF THE DRAWINGS

FIG. 16A is an explanatory view showing luminance distribution when LEDs are disposed in a normal arrangement, and FIG. 16B is an explanatory view showing luminance distribution when LEDs are disposed in a zigzag arrangement.

DETAILED DESCRIPTION OF EMBODIMENTS

Embodiment 1

An embodiment of the present invention will be descried below with reference to figures.

Figure 2:
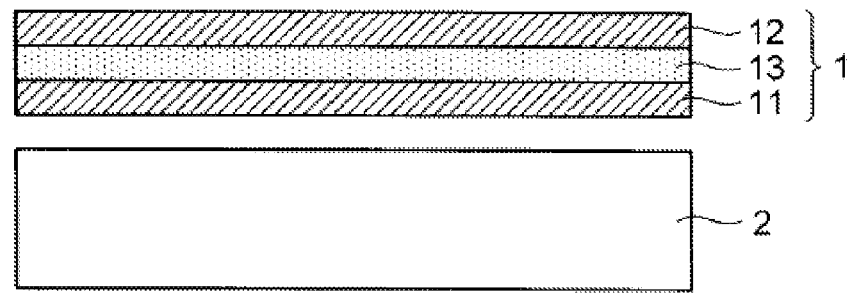
FIG. 2 is a cross-sectional view showing a schematic configuration of a liquid crystal display device equipped with the above-mentioned backlight device.

FIG. 2 is a cross-sectional view showing a schematic configuration of a liquid crystal display device according to the present embodiment. This liquid crystal display device includes a liquid crystal panel 1 and a backlight device 2.

The liquid crystal panel 1 is a display element showing an image by modulating illumination light from the backlight device 2 per pixel in accordance with an image data, and is made of two transparent substrates 11 and 12 as well as a liquid crystal layer 13 that is held between these two transparent substrates 11 and 12. A switching element (TFT; Thin Film Transistor, for example) for turning on and off each pixel, various wires (a scanning line, a signal line), and the like are formed on one transparent substrate 11. A color filter, an opposite electrode, and the like are formed on the other transparent substrate 12. A polarizing plate, which is not shown in the figure, is respectively disposed on outsides (sides opposite to the liquid crystal layer 13) of the two transparent substrates 11 and 12.

Figure 1A:
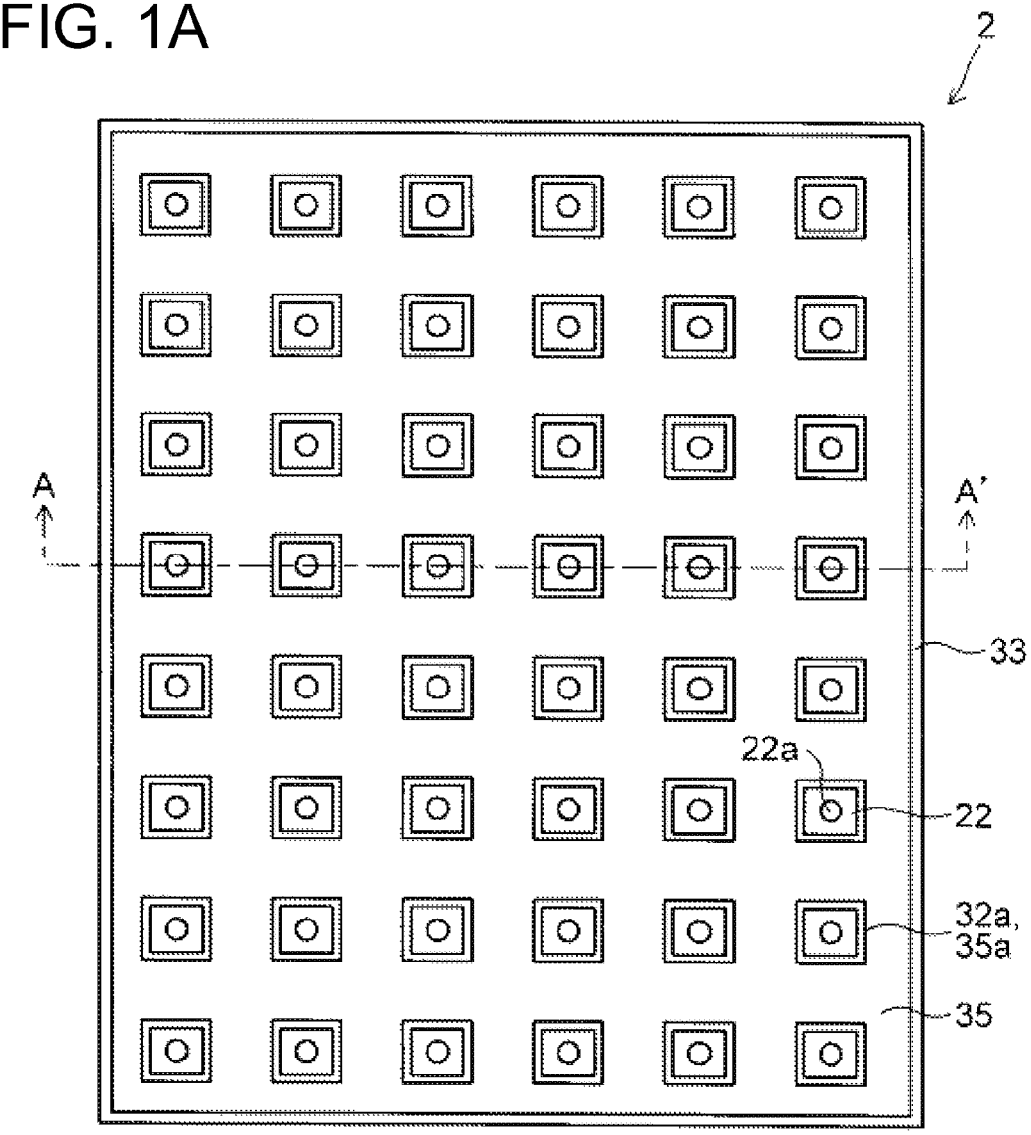
FIG. 1A is a plan view showing a schematic configuration of a backlight device as a light source device of an embodiment of the present invention.
Figure 1B:
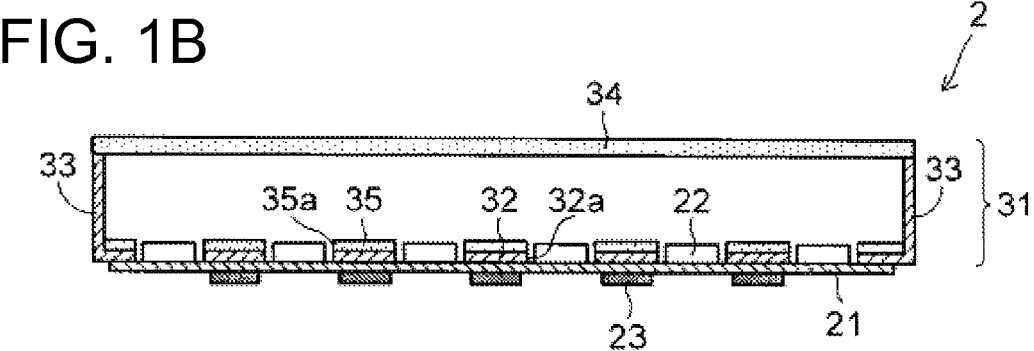
FIG. 1B is a cross-sectional view along the line A-A' of FIG. 1A.
Figure 3:
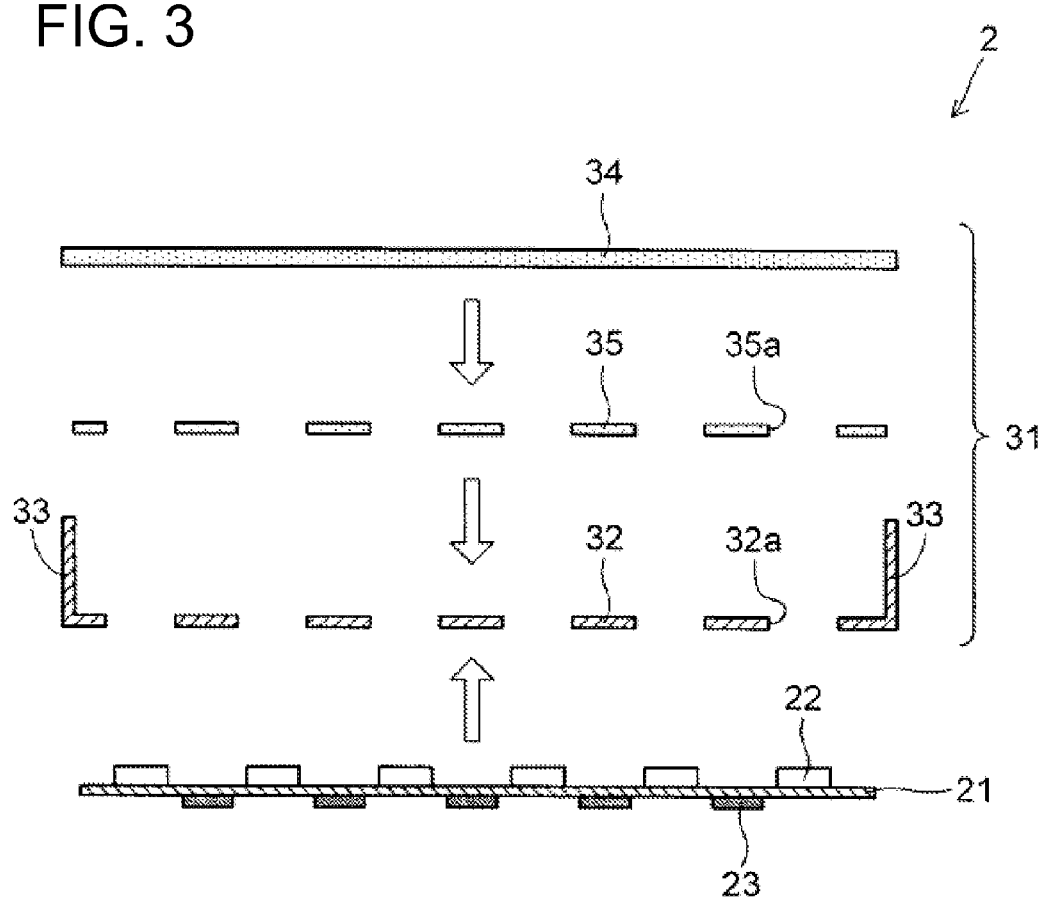
FIG. 3 is a cross-sectional view showing an exploded view of the above-mentioned backlight device.

The backlight device 2 is a light source device for emitting light onto the liquid crystal panel 1, and is disposed directly below the liquid crystal panel 1. Here, FIG. 1A is a plan view showing a schematic configuration of the backlight device 2, and FIG. 1B is a cross-sectional view along the line A-A' of FIG. 1A. A diffusion plate 34 of a case 31, which will be described later, is not shown in FIG. 1A for convenience. Further, FIG. 3 is a cross-sectional view showing an exploded view of the backlight device 2. The backlight device 2 includes a substrate 21 and the case 31.

The substrate 21 is a hard substrate based on a glass epoxy material or a CEM material (Composite Epoxy Material), for example. Moreover, the substrate 21 is also a double-sided substrate or a multi-layered substrate in which copper foil patterns on a front surface and a rear surface thereof are conducted via through-holes. While LEDs 22 are mounted on the front surface of the substrate 21, driver circuits 23 are mounted on the rear surface of the substrate 21. In other words, the substrate 21 is a common substrate on which both the LEDs 22 and the driver circuits 23 are mounted.

The LEDs 22 are a light source for emitting light from light-emitting parts 22a, and have a so-called top view shape for emitting light in the front direction (direction toward the liquid crystal panel 1) with respect to the mounted surface (a surface of the substrate 21) in the present embodiment. Moreover, in the present embodiment, the LEDs 22 are arranged on the surface of the substrate 21 two-dimensionally. Specifically, they are specifically disposed in a matrix-shaped normal arrangement. That is, the LEDs 22 are arranged on the front surface of the substrate 21 so that the adjacent LEDs in rows as well as the adjacent LEDs in columns have an identical pitch. The driver circuits 23 are IC parts for driving the LEDs 22, and are mounted on the rear surface of the substrate 21 in a position corresponding to an area between adjacent LEDs 22.

The case 31 holds the substrate 21, and is made of a bottom plate 32, four side walls 33, and the diffusion plate 34. Openings 32a in accordance with the size of the LEDs 22 are formed in the bottom plate 32. A formation pitch of these openings 32a is equivalent to an arrangement pitch of the LEDs 22 that are mounted on the surface of the substrate 21. The above-mentioned substrate 21 is in contact with and fixed to the bottom plate 32 of the case 31 from the outside of the case 31 with the LEDs 22 fitted in the openings 32a.

Further, in an area contacting the bottom plate 32 on the surface of the substrate 21, a copper foil pattern is absent or only a ground pattern is formed. Then, a copper foil pattern in an area in which the LEDs are mounted is connected to a copper foil pattern on the rear surface or an inner layer of the substrate 21 via a through-hole. As a result, it is possible to secure conduction of the LEDs 22, and to prevent an electrical short-circuit that is caused when the substrate 21 contacts the bottom plate 32.

Moreover, a reflective sheet 35 for reflecting incident light is formed on the surface (surface opposite to the side in contact with the substrate 21) of the bottom plate 32. Because of this reflective sheet 35, even when light, which has been emitted from the LEDs 22 and has been reflected inside of the case 31, travels in a direction toward the bottom plate 32, the light is reflected by the reflective sheet 35 on the surface of the bottom plate 32, and therefore, it is possible to prevent the above-mentioned light from entering to the bottom plate 32 and being absorbed there, thereby improving light usage efficiency.

Further, the openings 35a are formed in the reflective sheet 35 in positions corresponding to the openings 32a of the bottom plate 32. This way, light emitted from the LEDs 22 progresses forward (to the diffusion plate 34 side) through the openings 35a, and therefore, the above-mentioned progression of light is not interrupted by the reflective sheet 35. In the present embodiment, the size of the openings 35a in the reflective sheet 35 is same as the size of the openings 32a in the bottom plate 32.

The four side walls 33 are formed standing perpendicular to the outer periphery of the bottom plate 32, and these four side walls 33 constitute an outer frame of the case 31. The bottom plate 32 and the side walls 33 are integrated, and they can be collectively called a backlight plate (backlight chassis) as well. The backlight plate is made of an iron material that has an approximate thickness of 0.5 to 2 mm, for example.

The diffusion plate 34 is fixed to the four side walls 33 so as to face the bottom plate 32. As a result, within the backlight device 2, the diffusion plate 34 is positioned on a side closest to the liquid crystal panel 1. The diffusion plate 34 is an optical sheet (optical member) that diffuses and uniforms light emitted from the LEDs 22, and supplies the light to the liquid crystal panel 1 as illumination light. Because of this diffusion plate 34, the luminance distribution of the backlight device 2 becomes even, and thereby achieving a surface light source (backlight device 2) in which a lamp image of each LED 22 is invisible. Moreover, various kinds of optical sheets or the like may be laminated on the diffusion plate 34 to further uniform the luminance distribution as well.

When the backlight device 2 is assembled, as shown in FIG. 3, the openings 32a that are escape holes of the LEDs 22 are formed by creating square holes in accordance with the arrangement pitch of the LEDs 22 in the bottom plate 32 of the case 31. Similarly, the openings 35a that are escape holes of the LEDs 22 are also formed by creating square holes in accordance with the arrangement pitch of the LEDs 22 in the reflective sheet 35, which will be attached to a surface of the bottom plate 32. Then, the reflective sheet 35 is attached to the bottom plate 32 such that the positions of the openings 32a and the openings 35a match each other. Moreover, the openings 32a and the openings 35a may also be formed at the same time by attaching the reflective sheet 35 to the bottom plate 32 first, and then creating square holes in them at the same time. Then, the diffusion plate 34 is attached to the side walls 33 so as to face the bottom plate 32, and the substrate 21 is attached to the bottom plate 32 from the outside of the case 31. As a result, the substrate 21 is held by the case 31 with the LEDs 22 fitted in the openings 32a of the bottom plate 32.

According to the above-mentioned configuration, the temperature of the LEDs 22 becomes high when they emit light, and the larger the current that flows to the LEDs 22, the higher the temperature of the LEDs 22 rises. The light-emitting efficiency (lm/W) of the LEDs 22 decreases as the temperature rises high. Moreover, an LED chip, which is a light-emitting source of the LEDs 22, will have an aging degradation due to heat. Therefore, it is necessary to design a heat dissipation mechanism that can prevent the temperature of the LEDs 22 from rising high as much as possible.

In this aspect, according to the configuration of the above-mentioned backlight device 2, the substrate 21 is fixed to the bottom plate 32 from the outside of the case 31 with the LEDs 22 fitted in the openings 32a of the bottom plate 32, and therefore, the face of the rear surface of the substrate 21 is in contact with the outside air except for a portion in which the driver circuits 23 are mounted. This way, heat generated by the LEDs 22 is dissipated to the outside air (dispersed to the outside) through the substrate 21. Accordingly, the internal temperature of the backlight device 2 is unlikely to become high, and it is possible to suppress a decrease in light-emitting efficiency of the LEDs 22, and to suppress an aging degradation of the LED chips due to heat regardless of color and luminous intensity of light emitted from the LEDs 22.

Figure 4:
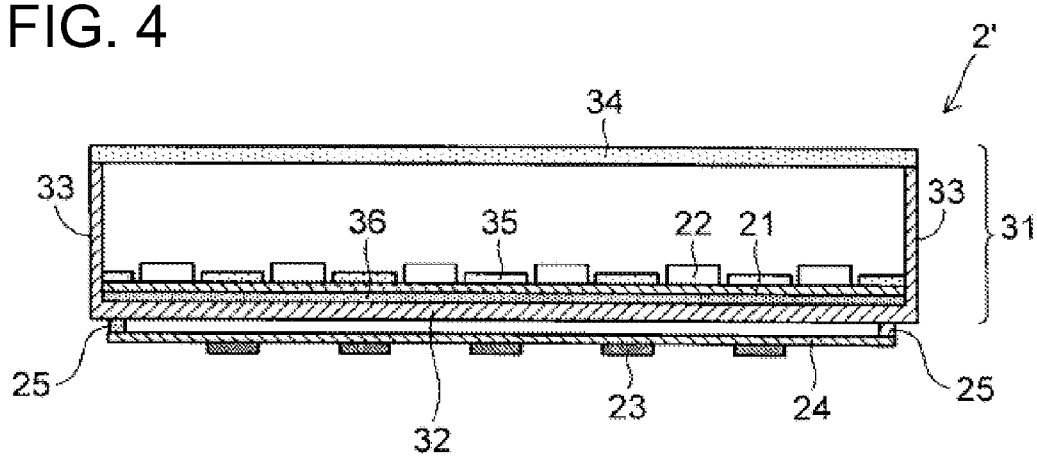
FIG. 4 is a cross-sectional view showing a backlight device of a comparison example.

Here, FIG. 4 is a cross-sectional view showing a schematic configuration of a backlight device 2' of the comparison example. In this backlight device 2', the driver circuits 23 are mounted on a substrate 24, which is different from the substrate 21, and this substrate 24 is fixed to the bottom plate 32 from the outside of the case 31 via columns 25. The substrate 21 is disposed inside the case 31, and is fixed to the bottom plate 32 through the heat conductive sheet 36.

Figure 5:
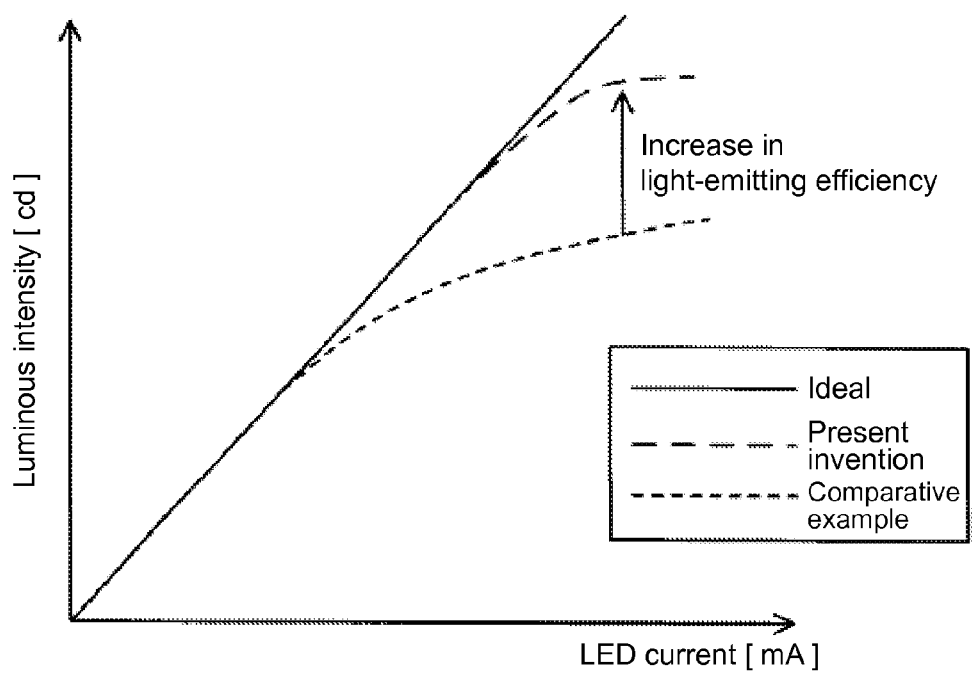
FIG. 5 is a graph showing light-emitting characteristics of an LED.

FIG. 5 is a graph showing light-emitting characteristics of the LEDs 22 in the backlight device 2 of the present embodiment and in the backlight device 2' of the comparison example. As shown in the figure, a decrease in light-emitting efficiency of the LEDs 22 due to an increase in LED current is suppressed in the backlight device 2 of the present embodiment as compared to the backlight device 2' of the comparison example. Accordingly, the backlight device 2 of the present embodiment has a configuration in which heat of the LEDs 22 is unlikely to stay within the case 31. Here, it is considered that because the backlight device 2' of the comparison example is sealed to prevent dust, dirt, and the like from entering inside, heat is likely to stay inside, which led to a decrease in light-emitting efficiency.

According to the configuration of the backlight device 2 of the present embodiment, heat generated by the LEDs 22 is transmitted to the rear surface through the substrate 21 and the heat is directly dissipated to the outside, and therefore, it is possible to achieve heat dissipation of the LEDs 22 without requiring a conventional heat dissipating mechanism (a heat dissipating plate, a heat pipe, a heat sink, and a cooling fan), which is made of many components, to be mounted below the LEDs 22. As a result, the backlight device 2 can be reduced in thickness, weight, and cost at the same time while suppressing the above-mentioned decrease in light-emitting efficiency of the LEDs 22. Therefore, it is possible to easily achieve a thin liquid crystal display device with light weight and low cost by combining the backlight device 2 and the liquid crystal panel 1 of the present embodiment.

Particularly, the driver circuits 23 of the LEDs 22 are mounted in the substrate 21 in which the LEDs 22 are also formed, and therefore, unlike the comparison example, it is not necessary to separately form the substrate 24, which is dedicated for mounting the driver circuits 23, and the columns 25 for fixing the substrate 24 to the case 31. Moreover, because the LEDs 22 are fitted in the openings 32a of the bottom plate 32 of the case 31 in the present embodiment, when calculating the thickness of the backlight device 2, it is possible to ignore the thickness of the bottom plate 32 if the height of the LEDs 22 above the substrate 21 is larger than the thickness of the bottom plate 32, and to ignore the height of the LEDs 22 if the height of the LEDs 22 is smaller than the thickness of the bottom plate 32.

As described above, in the backlight device 2 of the present embodiment, in addition to an aspect that there is no need to form a conventional heat dissipating mechanism under the LEDs 22, it is not necessary to form the substrate 24 or the columns 25 that are used in the comparison example, and the thickness of the bottom plate 32 or the height of the LEDs 22 can be ignored when calculating the thickness of the backlight device 2. Therefore, it is possible to dramatically reduce the thickness of the backlight device 2. Moreover, compared to the comparison example, the backlight device 2 can be further reduced in weight and cost because there is no need to form the substrate 24 and the columns 25. Particularly, effects of weight reduction become high as a result of forming the openings 32a in the bottom plate 32 of the case 31. Compared to the comparison example, a decrease in light-emitting efficiency of the LEDs 22 can also be suppressed without forming the heat conductive sheet 36, and therefore, the effects of reduction in thickness, weight, and cost can be further increased.

Moreover, in order to achieve a reduction in thickness of the backlight device 2, it is also possible to consider a method of reducing the thickness of the backlight device 2 by narrowing the distance between the LEDs 22 and the optical sheet (the diffusion plate 34, for example), for example. However, when the above-mentioned distance is narrowed, lamp images of the LEDs 22 become visible from the surface of the backlight device 2, and the uniformity of luminance distribution as a surface light source is lost. In other words, the LEDs 22 have directional characteristics, and luminous intensity is different depending on a light-emitting angle. Therefore, when the above-mentioned distance is too narrow, an area directly above the LEDs 22 is bright (luminous intensity is high), but an area between the LEDs 22 and 22 becomes dark. Therefore, in order to secure a uniform luminance distribution of the backlight device 2, it is necessary to have more than a certain distance between the LEDs 22 and the optical sheet (the distance cannot be narrower than the above-mentioned distance).

However, in the backlight device 2 of the present embodiment, because the thickness beneath the LEDs 22 can be reduced while securing the distance between the LEDs 22 and the optical sheet, it is possible to reduce the thickness of the entire backlight device 2 while securing the uniform luminance distribution of the backlight device 2.

Moreover, the formation pitch of the openings 32a in the bottom plate 32 of the case 31 is equivalent to the arrangement pitch of the LEDs 22 mounted in the surface of the substrate 21 in the present embodiment, and therefore, when the substrate 21 is fixed to the bottom plate 32 from the outside of the case 31, a plurality of LEDs 22 fit in the respective openings 32a with certainty. That is, the substrate 21 can be surely fixed to the bottom plate 32 with the plurality of LEDs 22 fitted in the respective openings 32a with certainty.

In the present embodiment, the driver circuits 23 are mounted on the rear surface of the substrate 21 in a position corresponding to an area between the adjacent LEDs 22, and therefore, the rear surface of the substrate 21 positioned directly below the LEDs 22 is exposed and contacts outside air. As a result, heat dissipating efficiency can be improved and a decrease in light-emitting efficiency of the LEDs 22 can be suppressed with certainty.

Embodiment 2

Another embodiment of the present invention will be described below with reference to the figures. Here, for convenience of the following description, component numbers same as the ones used in Embodiment 1 are used for the same configurations, and the description of them will be omitted.

Figure 6A:
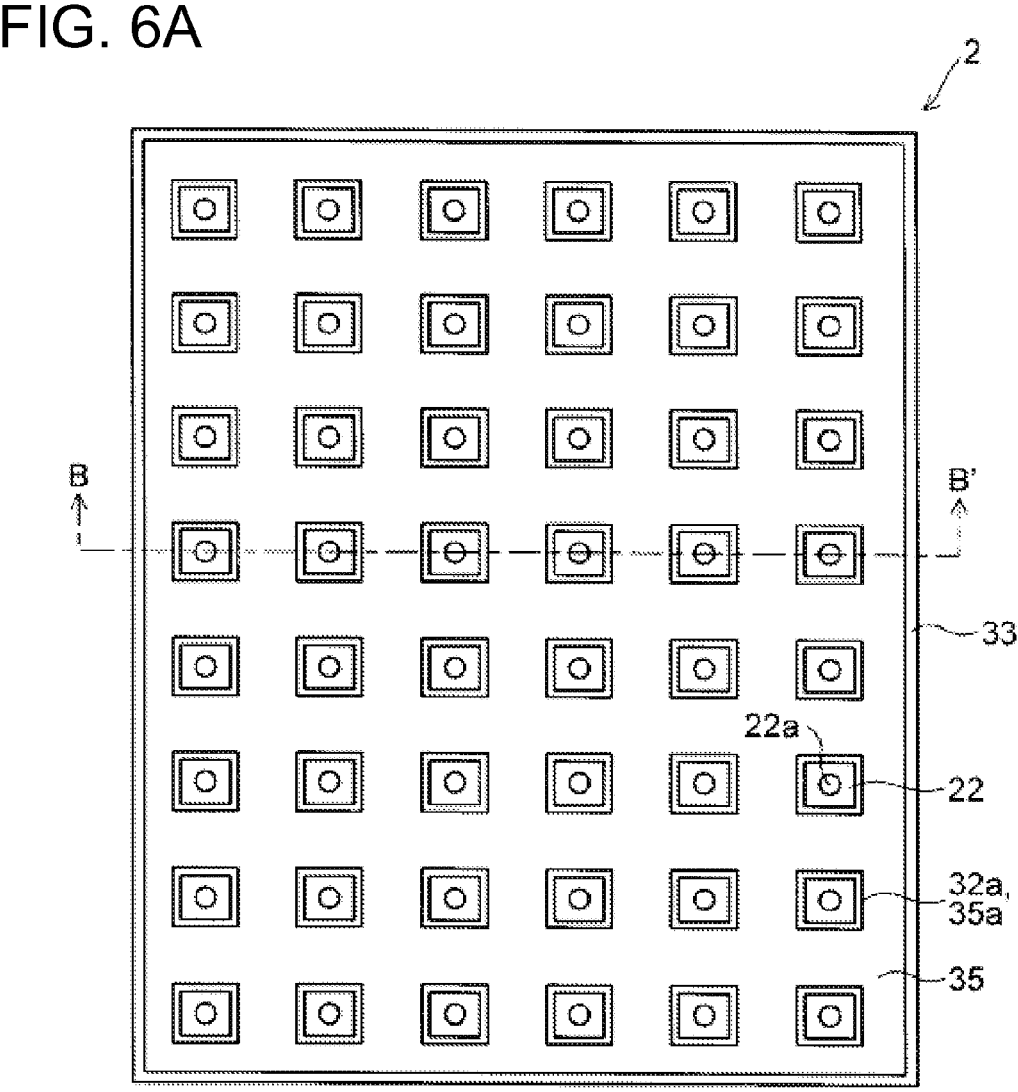
FIG. 6A is a plan view showing a schematic configuration of a backlight device according to another embodiment of the present invention.
Figure 6B:
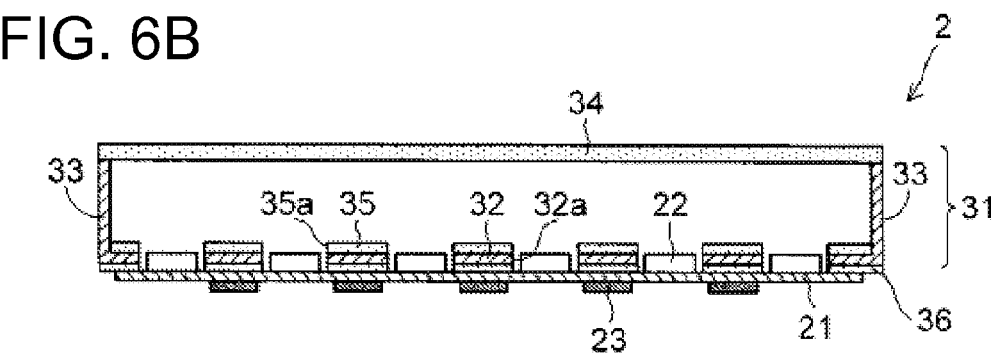
FIG. 6B is a cross-sectional view along the line B-B' of FIG. 6A.

FIG. 6A is a plan view showing a schematic configuration of a backlight device 2 of the present embodiment, and FIG. 6B is a cross-sectional view along the line B-B' of FIG. 6A. Here, the diffusion plate 34 of the case 31 is not shown in FIG. 6A for convenience. The backlight device 2 of the present embodiment further includes a heat conductive sheet 36 in addition to the configuration of Embodiment 1. The heat conductive sheet 36 is a heat dissipation member that conducts heat of the LEDs 22, and is disposed between the bottom plate 32 of the case 31 and the substrate 21.

Figure 7:
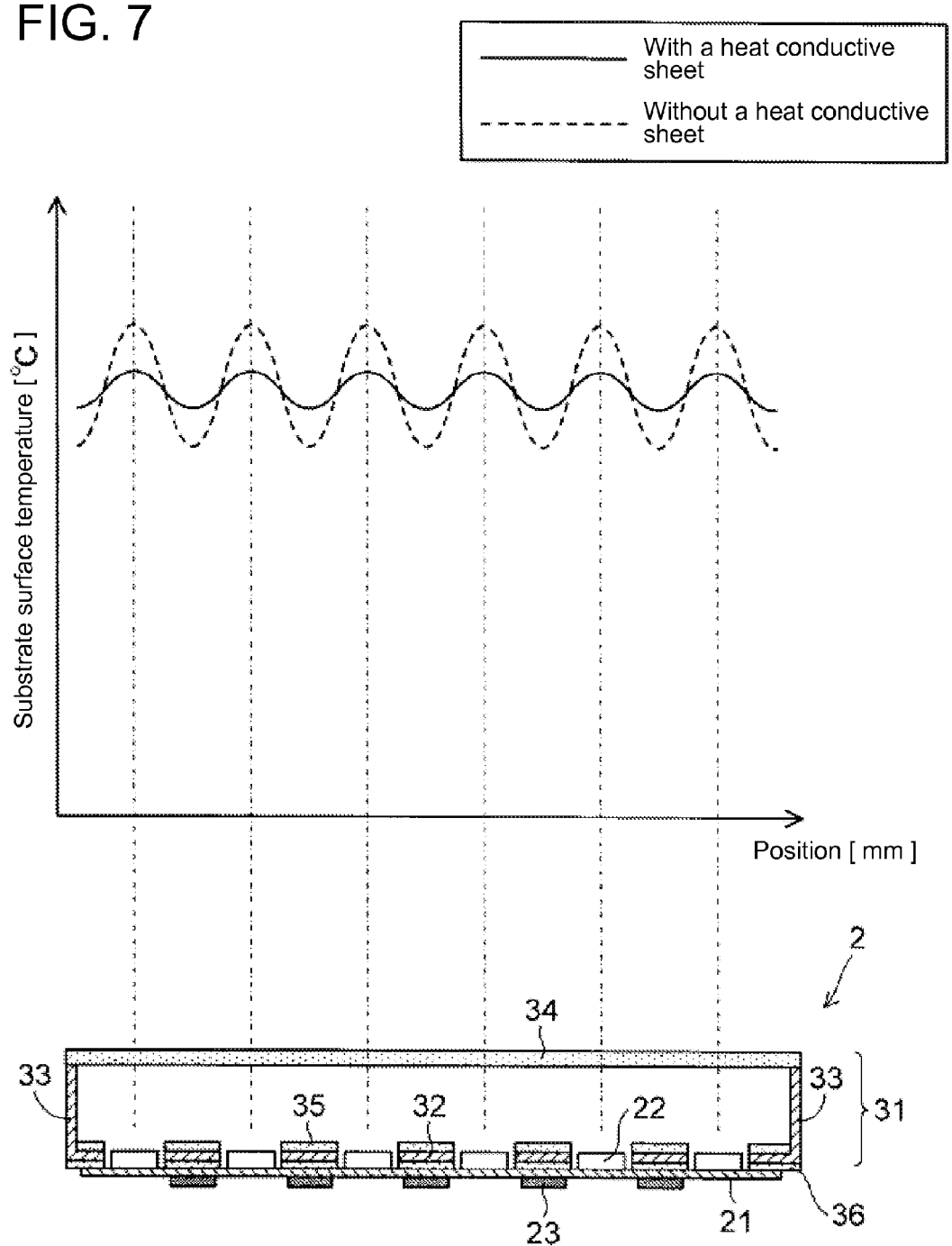
FIG. 7 is an explanatory view showing a temperature distribution of a substrate surface on which LEDs are formed.

Here, FIG. 7 is an explanatory view showing the temperature distribution of a surface of the substrate 21 in which LEDs 22 are mounted. When the arrangement pitch of LEDs 22 is wide and the heat conductive sheet 36 is not formed, heat cannot be conducted between the adjacent LEDs 22 and 22 very well, and the temperature of the surface of the substrate 21 is likely to become uneven as shown in the dashed line graph.

In contrast, when the heat conductive sheet 36 is formed as in the present embodiment, heat of the LEDs 22 is conducted through the heat conductive sheet 36 in a direction in which the sheet is laid (horizontal direction perpendicular to the thickness direction of the sheet). In other words, heat near the areas in which the LEDs 22 are mounted, which are areas with a high temperature, are dispersed to areas in which the LEDs 22 are absent. This way, it is possible to improve heat dissipating performance near the areas in which the LEDs 22 are mounted, and an increase in peak temperature near the LEDs 22 can be reduced. As a result, uneven temperature on the surface of the substrate 21 can be reduced as shown in the solid line graph.

Accordingly, as a result of fixing the substrate 21 to the bottom plate 32 through the heat conductive sheet 36, heat can be evened out in the horizontal direction, and an increase in peak temperature can be reduced near the LEDs 22. Therefore, it is possible to achieve a higher effect of suppressing a decrease in light-emitting efficiency of the LEDs 22.

Embodiment 3

Another embodiment of the present invention will be described below with reference to the figures. Here, for convenience of the following description, component numbers same as the ones used in Embodiments 1 and 2 are used for the same configurations, and the description of them will be omitted.

Figure 8A:
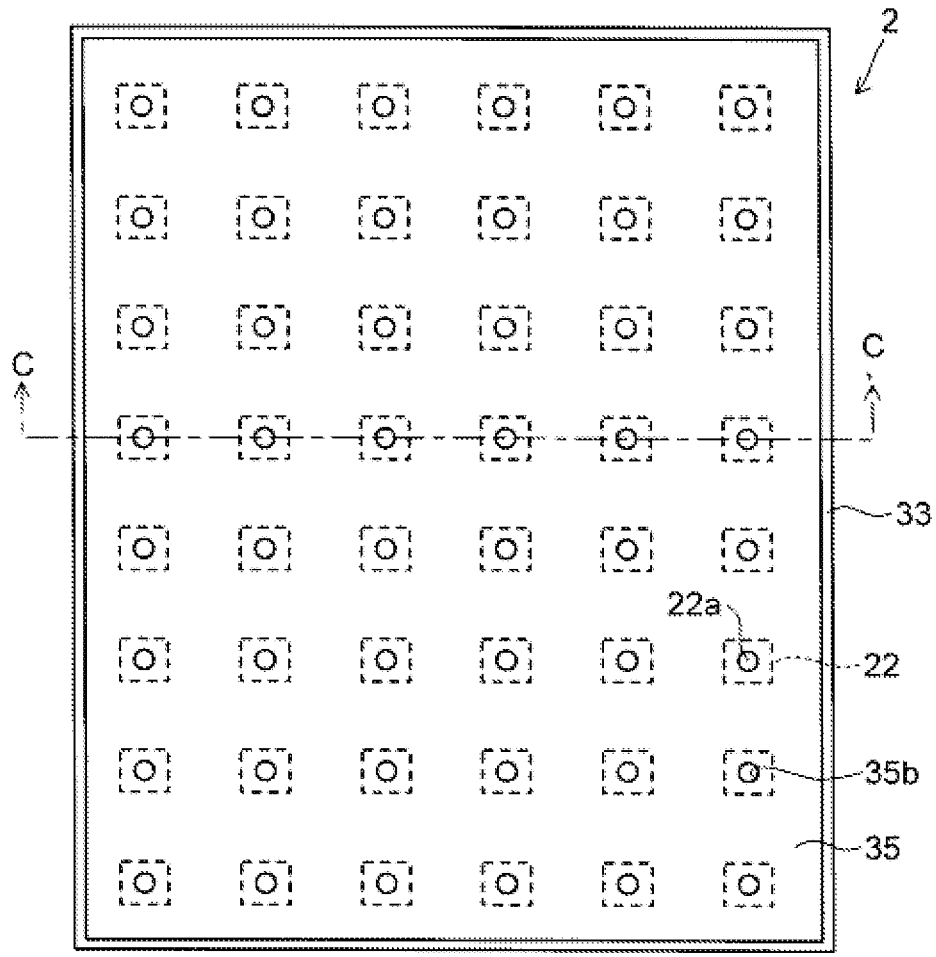
FIG. 8A is a plan view showing a schematic configuration of a backlight device according to another embodiment of the present invention.
Figure 8B:
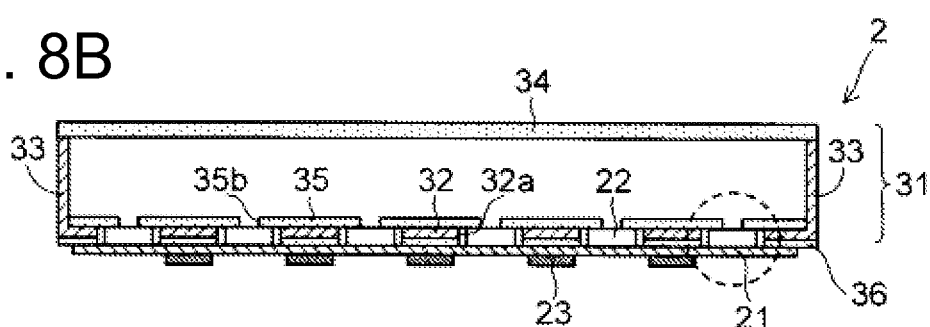
FIG. 8B is a cross-sectional view along the line C-C' of FIG. 8A.
Figure 8C:
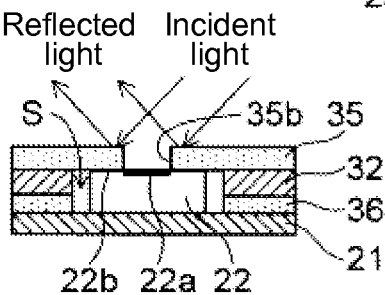
FIG. 8C is a cross-sectional view showing a magnified view of an area indicated by a dashed line in FIG. 8B.

FIG. 8A is a plan view showing a schematic configuration of a backlight device 2 of the present embodiment, FIG. 8B is a cross-sectional view along the line C-C' of FIG. 8A, and FIG. 8C is a cross-sectional view showing a magnified view of an area indicated by a dashed line in FIG. 8B. Here, the diffusion plate 34 of the case 31 is not shown in FIG. 8A for convenience. The backlight device 2 of the present embodiment is based on the configuration of Embodiment 2, and has a configuration in which the reflective sheet 35 includes holes 35b that are formed in the positions corresponding to the light-emitting parts 22a of the LEDs 22, and the reflective sheet 35 is formed on a surface of the bottom plate 32 of the case 31, which is opposite to a surface to which the substrate 21 is fixed, so as to cover the entire region except for the light-emitting parts 22a. In other words, the shape of the holes 35b of the reflective sheet 35 is same as the shape of the light-emitting parts 22a of the LEDs 22, and the size of the holes 35b is smaller than the openings 35a of the reflective sheet 35 of Embodiment 2.

When the reflective sheet 35 is formed so as to cover the entire region except for the light-emitting parts 22a of the LEDs 22, as described above, the reflective sheet 35 also covers a gap S around the LEDs 22 and a surface 22b, which is an area other than the light-emitting parts 22a of the LEDs 22. This way, even when light that has been emitted from the light-emitting parts 22a and has passed through the holes 35b of the reflective sheet 35 is reflected inside the case 31 and comes back to near the LEDs 22, the light is reflected on the reflective sheet 35, and therefore, it is possible to prevent the light from being absorbed in the gap S and the surface 22b. As a result, it is possible to achieve a backlight device 2 with high light usage efficiency in which loss of light absorption is eliminated. Accordingly, the luminance can be improved when power consumption is at a fixed volume, and power consumption can be reduced when the luminance is at a fixed level.

Embodiment 4

Another embodiment of the present invention will be described below with reference to the figures. Here, for convenience of the following description, component numbers same as the ones used in Embodiments 1 to 3 are used for the same configurations, and the description of them will be omitted.

Figure 9A:
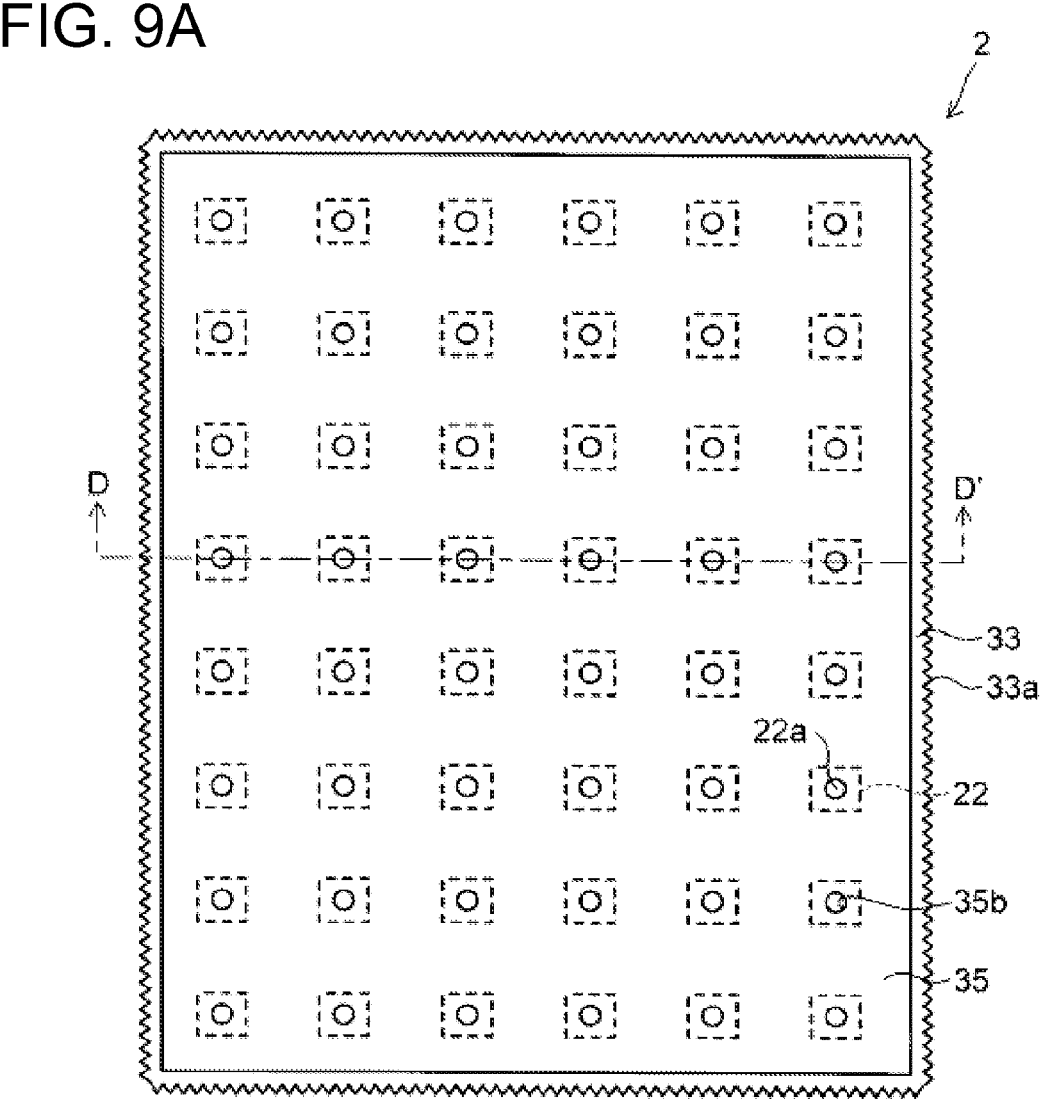
FIG. 9A is a plan view showing a schematic configuration of a backlight device according to another embodiment of the present invention.
Figure 9B:
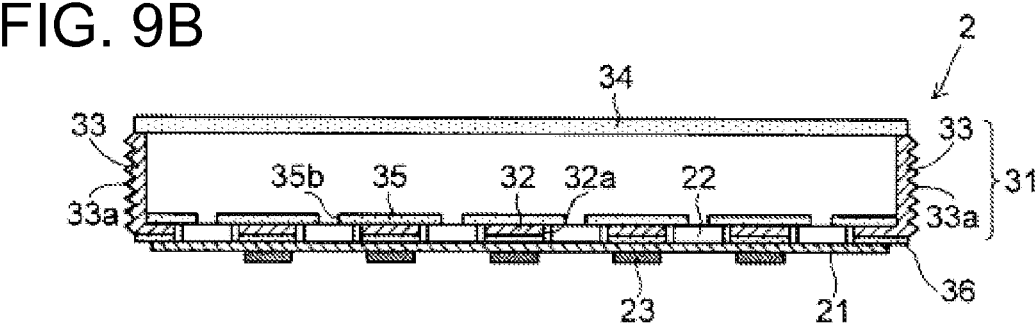
FIG. 9B is a cross-sectional view along the line D-D' of FIG. 9A.

FIG. 9A is a plan view showing a schematic configuration of a backlight device 2 of the present embodiment, and FIG. 9B is a cross-sectional view along the line D-D' of FIG. 9A. Here, the diffusion plate 34 of the case 31 is not shown in FIG. 9A for convenience. The backlight device 2 of the present embodiment has a configuration in which a surface roughing treatment has been performed on the outer surface of the four side walls 33 of the case 31 in the configuration of Embodiment 3 to make the outer surface a rough surface 33a.

Here, a surface roughing treatment means a process in which recesses and projections are formed on the surface so that the surface becomes rough. As a method of performing such a surface roughing treatment, a (sand) blast process, an etching process, a cutting process, or the like can be considered, for example, and any of these processes may be used. Moreover, the rough surface 33a may be a surface in which a plurality of grooves are formed along one direction (surface in which recesses and projections are interchangeably formed), or may be a pearskin shaped or embossed shaped surface as well.

Figure 10:
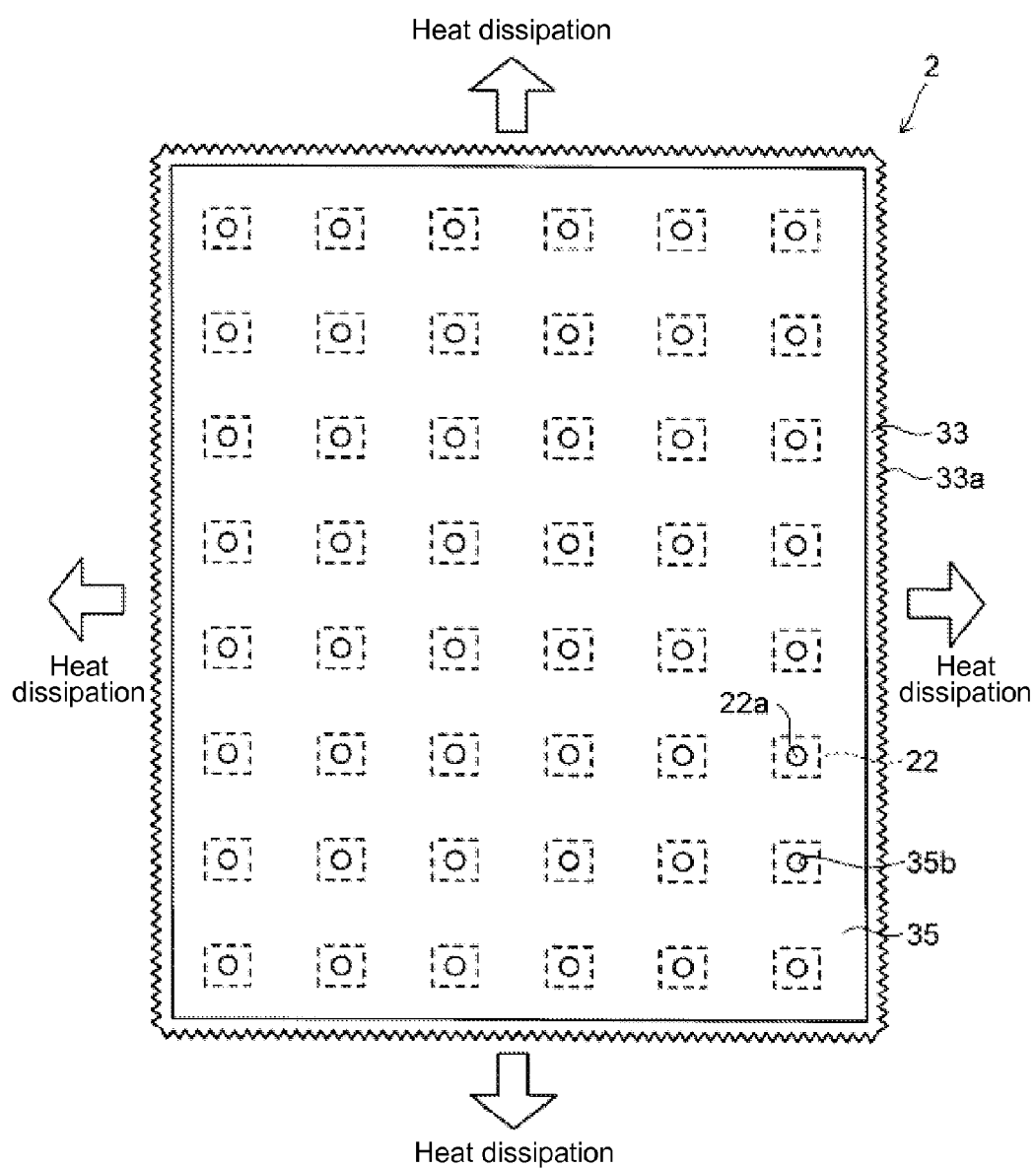
FIG. 10 is an explanatory view schematically showing how heat is dissipated from the side walls of the above-mentioned backlight device.

When the outer surface of the four side walls 33 is the rough surface 33a having recesses and projections, the surface area of the outer surface becomes larger than when the outer surface is a flat surface having no recesses and projections. This way, heat dissipating performance is improved in the four side walls 33, and an increase in temperature inside the case 31 can be suppressed as shown in FIG. 10. Therefore, because of the above-mentioned heat dissipation through the side walls 33 in addition to heat dissipation to the outside air by the substrate 21, a decrease in light-emitting efficiency of the LEDs 22 can be further suppressed, and the luminance can be further improved (or power consumption can be further reduced).

Moreover, when putting an emphasis on heat dissipating performance of the side walls 33, it is preferable that the surface roughness be as minute as possible so that a larger surface area can be secured.

Embodiment 5

Another embodiment of the present invention will be described below with reference to the figures. Here, for convenience of the following description, component numbers same as the ones used in Embodiments 1 to 4 are used for the same configurations, and the description of them will be omitted.

Figure 11A:
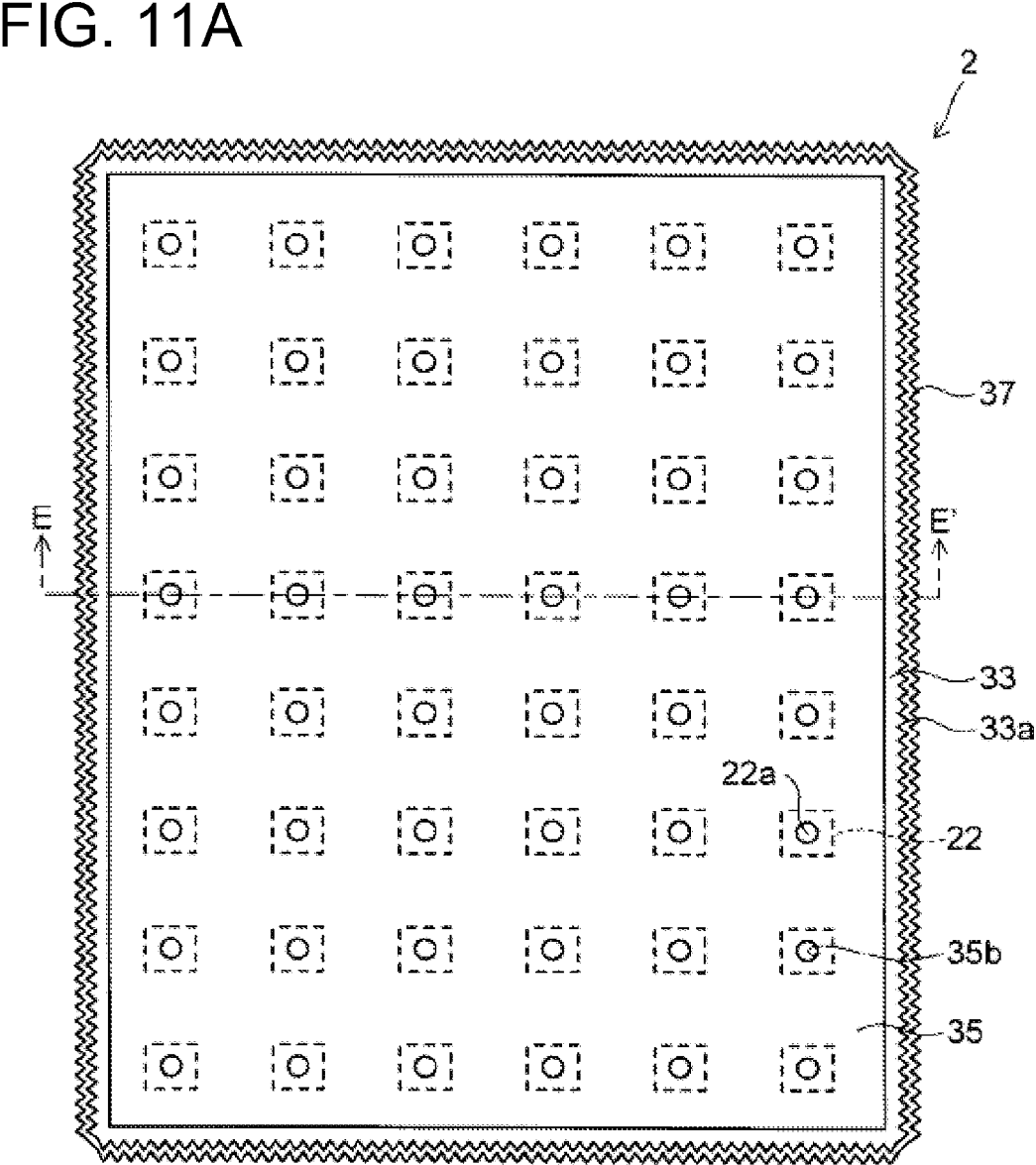
FIG. 11A is a plan view showing a schematic configuration of a backlight device according to another embodiment of the present invention.
Figure 11B:
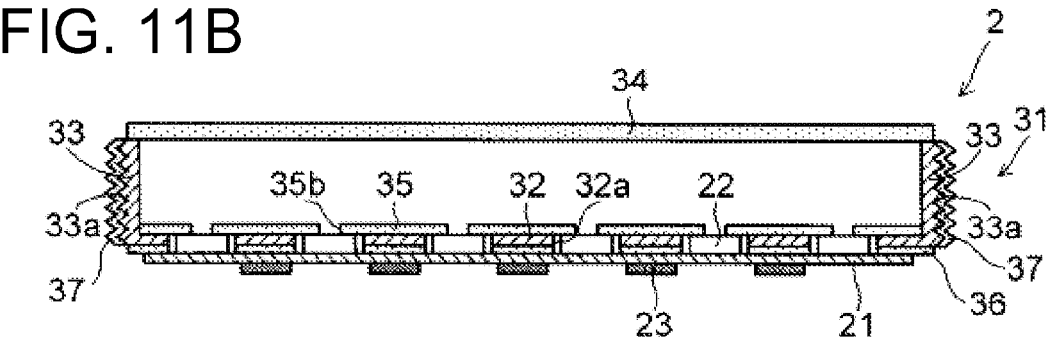
FIG. 11B is a cross-sectional view along the line E-E' of FIG. 11A.

FIG. 11A is a plan view showing a schematic configuration of a backlight device 2 of the present embodiment, and FIG. 11B is a cross-sectional view along the line E-E' of FIG. 11A. Here, the diffusion plate 34 of the case 31 is not shown in FIG. 11A for convenience. The backlight device 2 of the present embodiment has a configuration in which a coating material 37 with high emissivity is applied to the outer surface (the rough surface 33a) of the four side walls 33 of the case 31 in the configuration of Embodiment 4.

Here, the emissivity means a ratio of energy released by an object to the ideal total radiant energy from a black body, and the emissivity can be considered high when the emissivity is equal to or higher than 0.9 and equal to or lower than 1.0. The coating material 37 is a resin-type coating material, and can be formed by including carbon, filler, or the like to a base material of acrylic resin or epoxy resin, for example. More specifically, the coating material 37 is formed by mixing the above-mentioned resin with metal, such as carbon (emissivity of 0.8) or graphite (emissivity of 0.93), or a metal compound, such as nickel oxide (NiO; emissivity of 0.9), silicon dioxide ($SiO_2$; emissivity of 0.83), or tantalum carbide (emissivity of 0.81). As a result, the coating material 37 with high emissivity (emissivity within the above-mentioned range) can be achieved.

Figure 12:
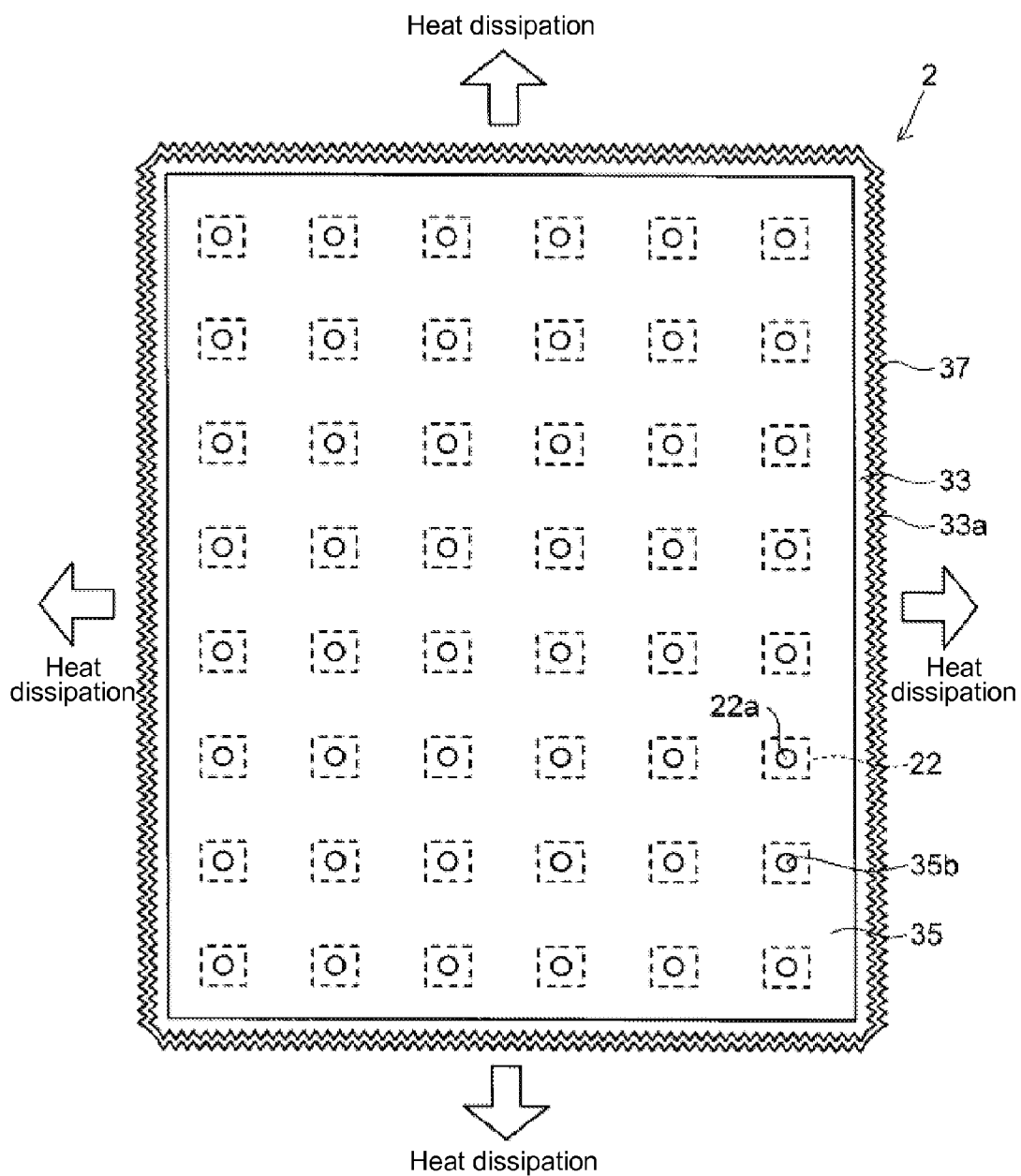
FIG. 12 is an explanatory view schematically showing how heat is dissipated from the side walls of the above-mentioned backlight device.

In the present embodiment, the coating material 37 with high emissivity is applied to the outer surface of the four side walls 33, and therefore, the radiation amount of far-infrared rays released from the outer surface increases, and the surface temperature is reduced. (The higher the emissivity is, the larger radiation cooling becomes.) As a result, as shown in FIG. 12, it is possible to further improve heat dissipating performance at the four side walls 33, and to further suppress an increase in temperature inside the case 31. Therefore, it is possible to further suppress a decrease in light-emitting efficiency of the LEDs 22, and to further improve the luminance (or further reduce power consumption) compared to the configuration of Embodiment 4. Moreover, with a simple configuration of applying the coating material 37 with high emissivity to the outer surface of the side walls 33, an increase in temperature inside the case 31 can easily be suppressed, and a decrease in light-emitting efficiency of the LEDs 22 can easily be suppressed as well.

Embodiment 6

Another embodiment of the present invention will be described below with reference to the figures. Here, for convenience of the following description, component numbers same as the ones used in Embodiments 1 to 5 are used for the same configurations, and the description of them will be omitted.

Figure 13A:
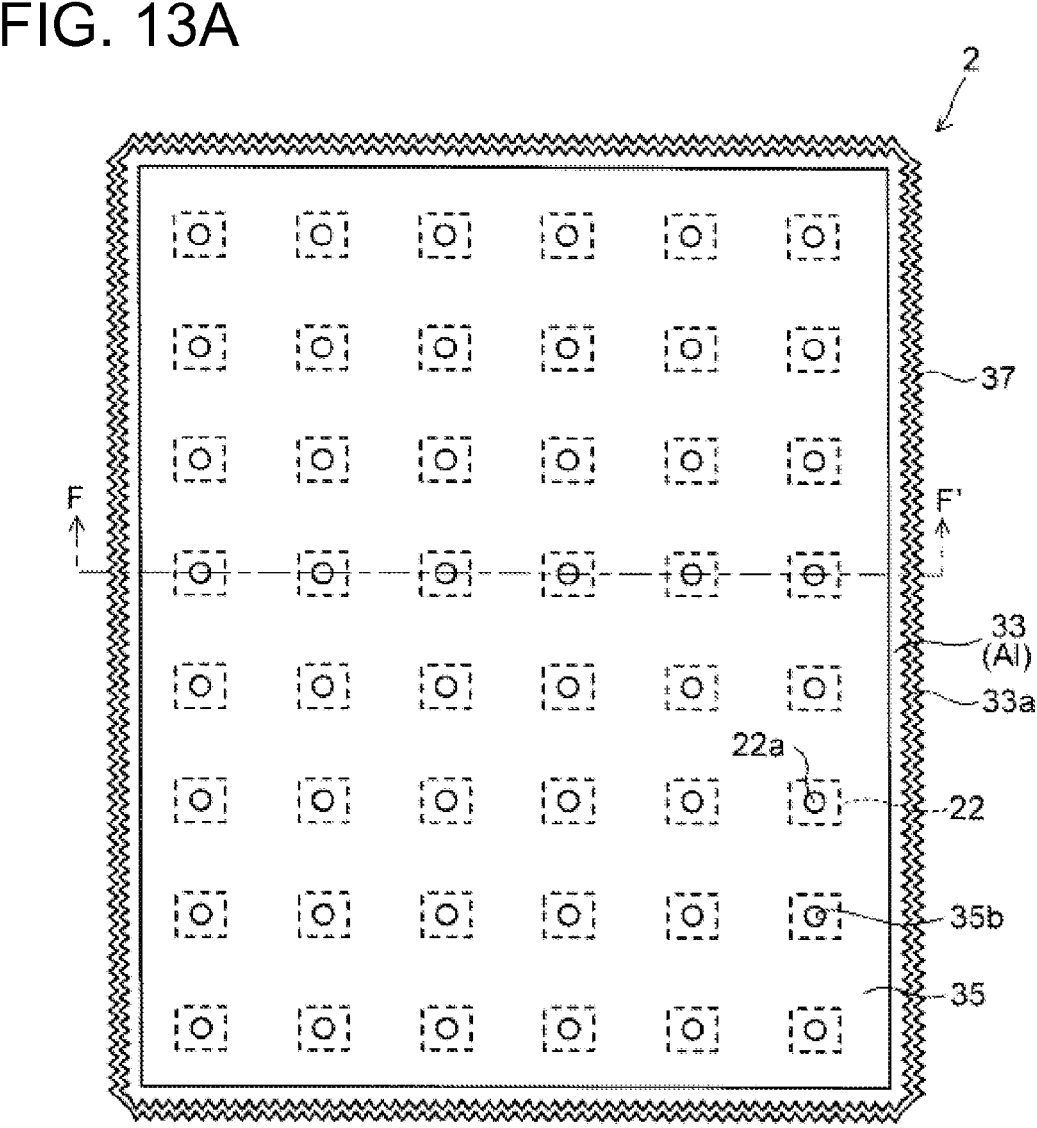
FIG. 13A is a plan view showing a schematic configuration of a backlight device according to another embodiment of the present invention.
Figure 13B:
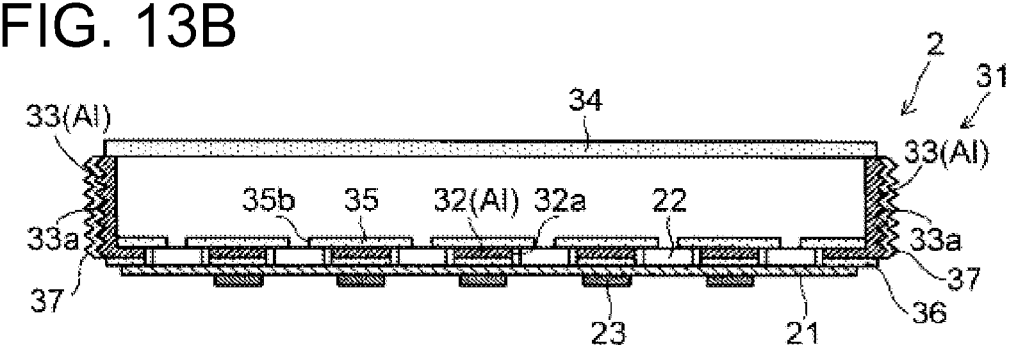
FIG. 13B is a cross-sectional view along the line F-F' of FIG. 13A.
Figure 14:
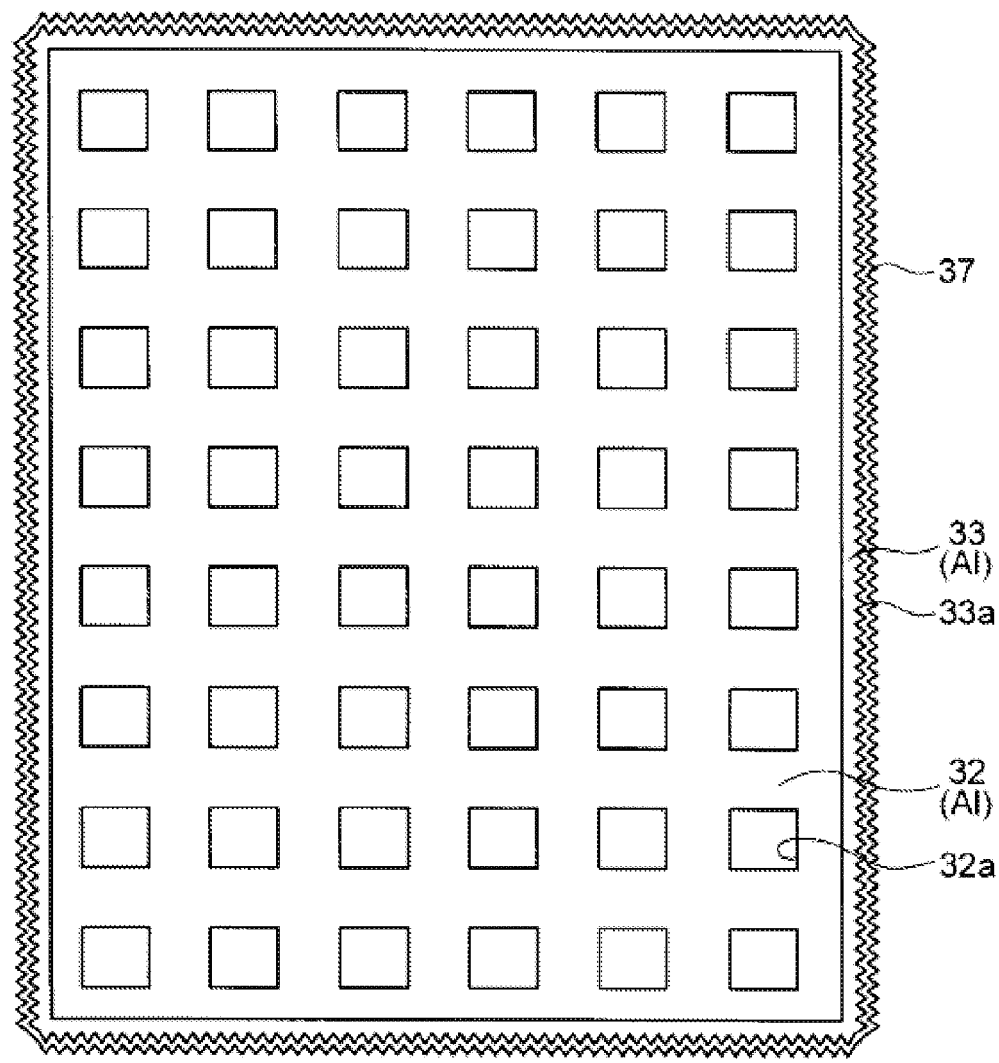
FIG. 14 is a plan view of a backlight plate of the above-mentioned backlight device.

FIG. 13A is a plan view showing a schematic configuration of a backlight device 2 of the present embodiment, and FIG. 13B is a cross-sectional view along the line F-F' of FIG. 13A. Here, the diffusion plate 34 of the case 31 is not shown in FIG. 13A for convenience. Moreover, FIG. 14 is a plan view of a backlight plate (the bottom plate 32 and the four side walls 33). The backlight device 2 of the present embodiment has a configuration in which the backlight plate is formed of aluminum alloy in the configuration of Embodiment 5. Further, the backlight plate made of aluminum alloy is also referred to as a bottom plate 32 (Al) and side walls 33 (Al) below.

Aluminum alloy has higher heat conductivity than iron (iron: 4 W/mK; aluminum alloy: 236 W/mK). Therefore, heat of the LEDs 22 is easily conducted to the bottom plate 32 (Al) and the side walls 33 (Al) of the case 31, and heat dissipating effect of the case 31 is improved. This way, it is possible to increase effects of suppressing a decrease in light-emitting efficiency of the LEDs 22 compared to when the bottom plate 32 and the side walls 33 are formed of iron as in Embodiment 5, for example. Further, the specific gravity of aluminum alloy is approximately one third of the specific gravity of iron (iron: 7.85; aluminum alloy: 2.7). Therefore, the backlight device 2 can be further reduced in weight compared to when the bottom plate 32 and the side walls 33 are formed of iron.

Embodiment 7

Another embodiment of the present invention will be described below with reference to the figures. Here, for convenience of the following description, component numbers same as the ones used in Embodiments 1 to 6 are used for the same configurations, and the description of them will be omitted.

Figure 15A:
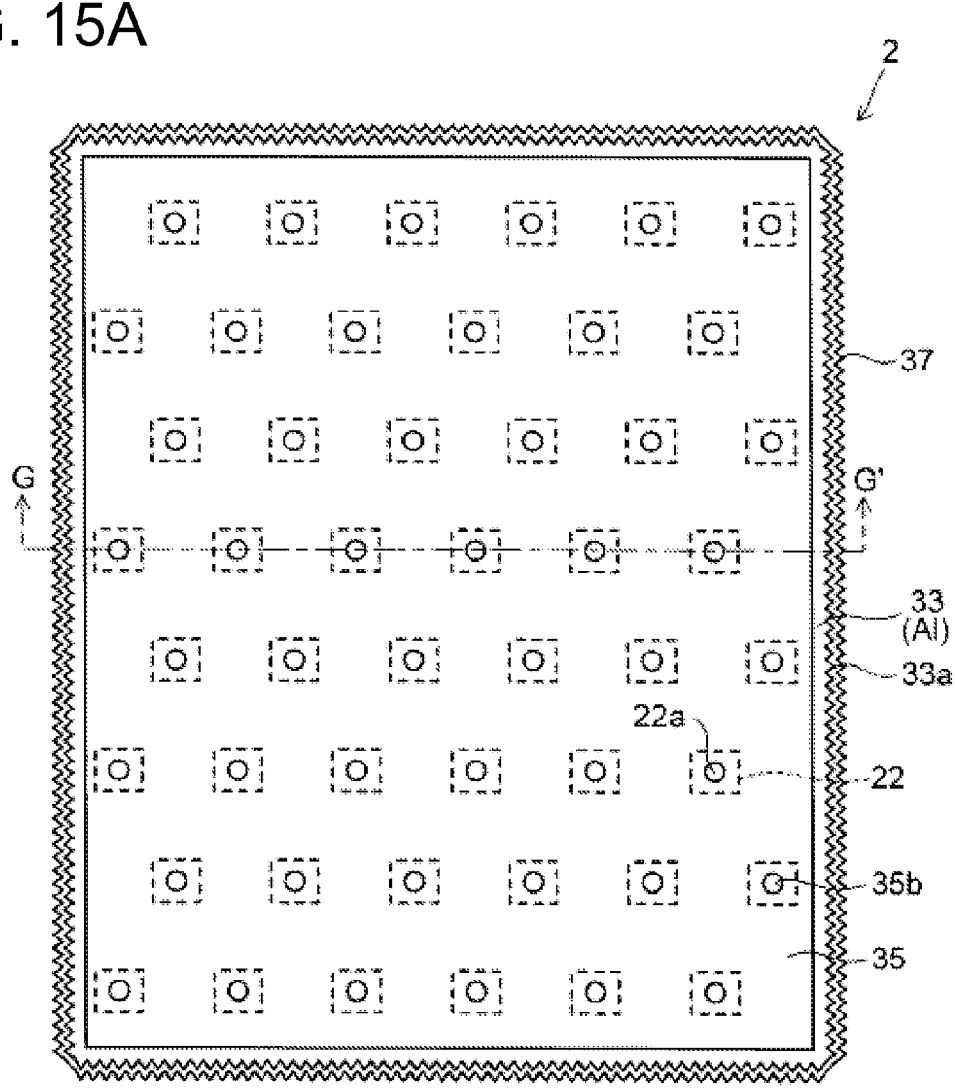
FIG. 15A is a plan view showing a schematic configuration of a backlight device according to another embodiment of the present invention.
Figure 15B:
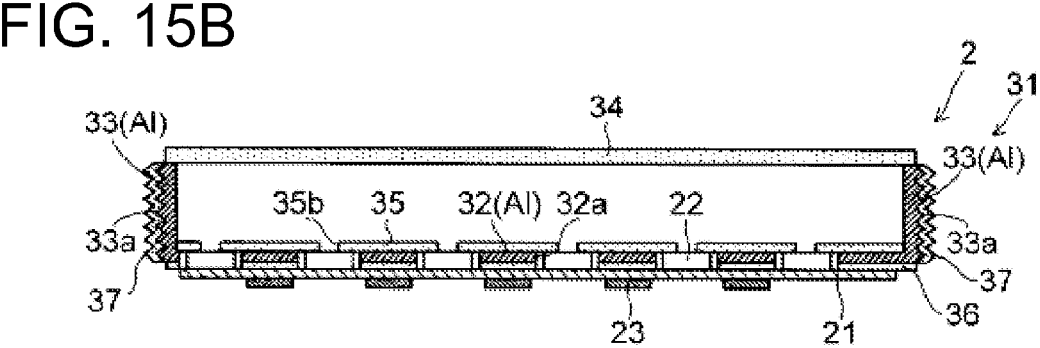
FIG. 15B is a cross-sectional view along the line G-G' of FIG. 15A.

FIG. 15A is a plan view showing a schematic configuration of a backlight device 2 of the present embodiment, and FIG. 15B is a cross-sectional view along the line G-G' of FIG. 15A. Here, the diffusion plate 34 of the case 31 is not shown in FIG. 15A for convenience. The backlight device 2 of the present embodiment has a configuration in which the LEDs 22 are disposed in a zigzag arrangement on a surface of the substrate 21 in the configuration of Embodiment 6. Here, a zigzag arrangement means an arrangement in which the LEDs 22 in a row direction and LEDs 22 in a column direction are disposed so as to be off arrangement from each other in the row direction or the column direction.

FIG. 16A is an explanatory view showing the luminance distribution of a surface P-P' and a surface Q-Q' when the LEDs 22 are disposed in a normal arrangement, and FIG. 16B is an explanatory view showing the luminance distribution of a surface P-P' and a surface Q-Q' when the LEDs 22 are disposed in a zigzag arrangement. For example, in a matrix-shaped normal arrangement in which the LEDs 22 are disposed in a row direction and in a column direction perpendicular to each other with an identical pitch, the pitch of the respective LEDs 22 is long in directions 45 degrees oblique with respect to the above-mentioned two directions, and therefore, the luminance in an area between the respective LEDs 22 and 22 is reduced in oblique angles of 45 degrees, and uniformity in luminance distribution is reduced.

In contrast, as a result of disposing the LEDs 22 in a zigzag arrangement, the distance between the respective LEDs 22 and 22 in oblique angles of 45 degrees is shortened compared to the normal arrangement, and therefore, a decrease in luminance in an area between the respective LEDs 22 and 22 is reduced in the above-mentioned directions. Accordingly, it is possible to improve uniformity of the luminance distribution. This can easily be understood by the fact that the luminance distribution curve of the surface Q-Q' in FIG. 16B has smaller amplitude than that of FIG. 16A.

Moreover, when the LEDs 22 are disposed in a zigzag arrangement, it is not necessary to laminate various optical sheets or the like on the diffusion plate 34 to even out the luminance distribution. In other words, because luminance distribution can easily be uniformed by disposing the LEDs 22 in a zigzag arrangement, the number of the optical sheets can be reduced, and the thickness and cost can be reduced as well.

Moreover, it is, of course, possible to constitute the backlight device 2 and a liquid crystal display device by appropriately combining the configurations of the respective embodiments described above.

INDUSTRIAL APPLICABILITY

The light source device of the present invention can be used as a direct backlight of a liquid crystal display device, for example.

DESCRIPTION OF REFERENCE CHARACTERS

1 liquid crystal panel
2 backlight device (light source device)
21 substrate
22 LED
22*a* light-emitting part
23 driver circuit
31 case
32 bottom plate
32*a* opening
33 side wall
33*a* rough surface
35 reflective sheet
35*b* hole
36 heat conductive sheet
37 coating material

The invention claimed is:

1. A light source device, comprising:
a substrate having a front surface on which a plurality of light-emitting diodes are mounted; and
a case having a bottom plate that holds said substrate, the case further having four side walls constituting an outer frame that is perpendicular to the bottom plate,
wherein a driver circuit for driving said light-emitting diodes is mounted on a rear surface of said substrate that is opposite to the front surface thereof,
wherein, for each of the light-emitting diodes, an opening corresponding to a size of said light-emitting diode is formed in the bottom plate of said case,
wherein the front surface of said substrate is fixed to a rear surface of the bottom plate of said case from outside of said case with said light-emitting diode fitted in said opening,
wherein a coating material with an emissivity of equal to or higher than 0.9 and equal to or lower than 1.0 is applied to an outer surface of the four side walls of said case, and
wherein said driver circuit is mounted on the rear surface of said substrate in a position, in a plan view, corresponding to an area between adjacent ones of the light-emitting diodes that are mounted on the front surface of the substrate so that said driver circuit is positioned where said light-emitting diodes are absent in the plan view.

2. The light source device according to claim 1, further comprising a heat conductive sheet that conducts heat of said light-emitting diodes,
wherein said substrate is fixed to the bottom plate of said case through said heat conductive sheet.

3. The light source device according to claim 1, further comprising a reflective sheet for reflecting incident light,
wherein, for each of light-emitting diodes, said reflective sheet includes a hole that is formed in a position corresponding to a light-emitting part of said light-emitting diode, and the reflective sheet is formed in the bottom plate of said case on a surface opposite to a side to which said substrate is fixed so as to cover an entire region of the surface except for said light-emitting part.

4. The light source device according to claim 1, wherein the outer surface of the four side walls constituting the outer frame that is perpendicular to the bottom plate of said case is a rough surface having recesses and projections.

5. The light source device according to claim 1, wherein the bottom plate of said case as well as the four side walls constituting the outer frame that is perpendicular to said bottom plate are formed of aluminum alloy.

6. The light source device according to claim 1, wherein said light-emitting diodes are disposed in a zigzag arrangement on a surface of said substrate.

7. The light source device according to claim 1, wherein a formation pitch of the openings in the bottom plate of said case is equivalent to an arrangement pitch of said light-emitting diodes mounted on the surface of said substrate.

8. A liquid crystal display device, comprising:
the light source device according to claim 1; and
a liquid crystal panel on which light is emitted by said light source device.

* * * * *